US012568547B2

(12) United States Patent
    Rahman

(10) Patent No.: US 12,568,547 B2
(45) Date of Patent: Mar. 3, 2026

(54) REMOVAL OF STALE CALL STATE DURING CALL SETUP

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 347 days.

(21) Appl. No.: 18/486,642

(22) Filed: Oct. 13, 2023

(65) Prior Publication Data

US 2025/0126667 A1     Apr. 17, 2025

(51) Int. Cl.
    *H04W 76/19*     (2018.01)
    *H04W 28/02*     (2009.01)

(52) U.S. Cl.
    CPC ....... *H04W 76/19* (2018.02); *H04W 28/0268* (2013.01)

(58) Field of Classification Search
    CPC . H04M 3/4365; H04M 3/42093; H04W 4/16; H04W 48/08; H04W 76/19; H04W 28/0268
    See application file for complete search history.

(56) References Cited

U.S. PATENT DOCUMENTS

| | | | | |
|---|---|---|---|---|
| 7,467,126 | B2 * | 12/2008 | Smith | G06F 16/2322 |
| 2004/0230552 | A1 * | 11/2004 | Smith | G06F 16/2322 |
| 2008/0159523 | A1 * | 7/2008 | Hare, Jr. | H04L 65/80 |
| | | | | 379/377 |
| 2008/0167039 | A1 * | 7/2008 | Guedalia | H04M 15/00 |
| | | | | 455/435.2 |
| 2011/0213897 | A1 * | 9/2011 | Zhao | H04W 76/10 |
| | | | | 709/248 |
| 2012/0150961 | A1 * | 6/2012 | Shatsky | H04L 69/28 |
| | | | | 709/204 |
| 2013/0223605 | A1 * | 8/2013 | Statham | H04L 41/069 |
| | | | | 379/201.02 |
| 2016/0345237 | A1 * | 11/2016 | Jain | H04W 72/53 |
| 2017/0201622 | A1 * | 7/2017 | Fei | H04M 3/42382 |

FOREIGN PATENT DOCUMENTS

| | | | | |
|---|---|---|---|---|
| WO | WO-2025013058 A1 * | 1/2025 | | H04W 76/38 |

* cited by examiner

*Primary Examiner* — Dung Hong

(74) *Attorney, Agent, or Firm* — Lee & Hayes, P.C.

(57) ABSTRACT

Described herein is a user equipment (UE) configured to determine that a failure of a call setup is due to a stale call state on the UE and, in response, remove the stale call state.

20 Claims, 4 Drawing Sheets

FIG. 1

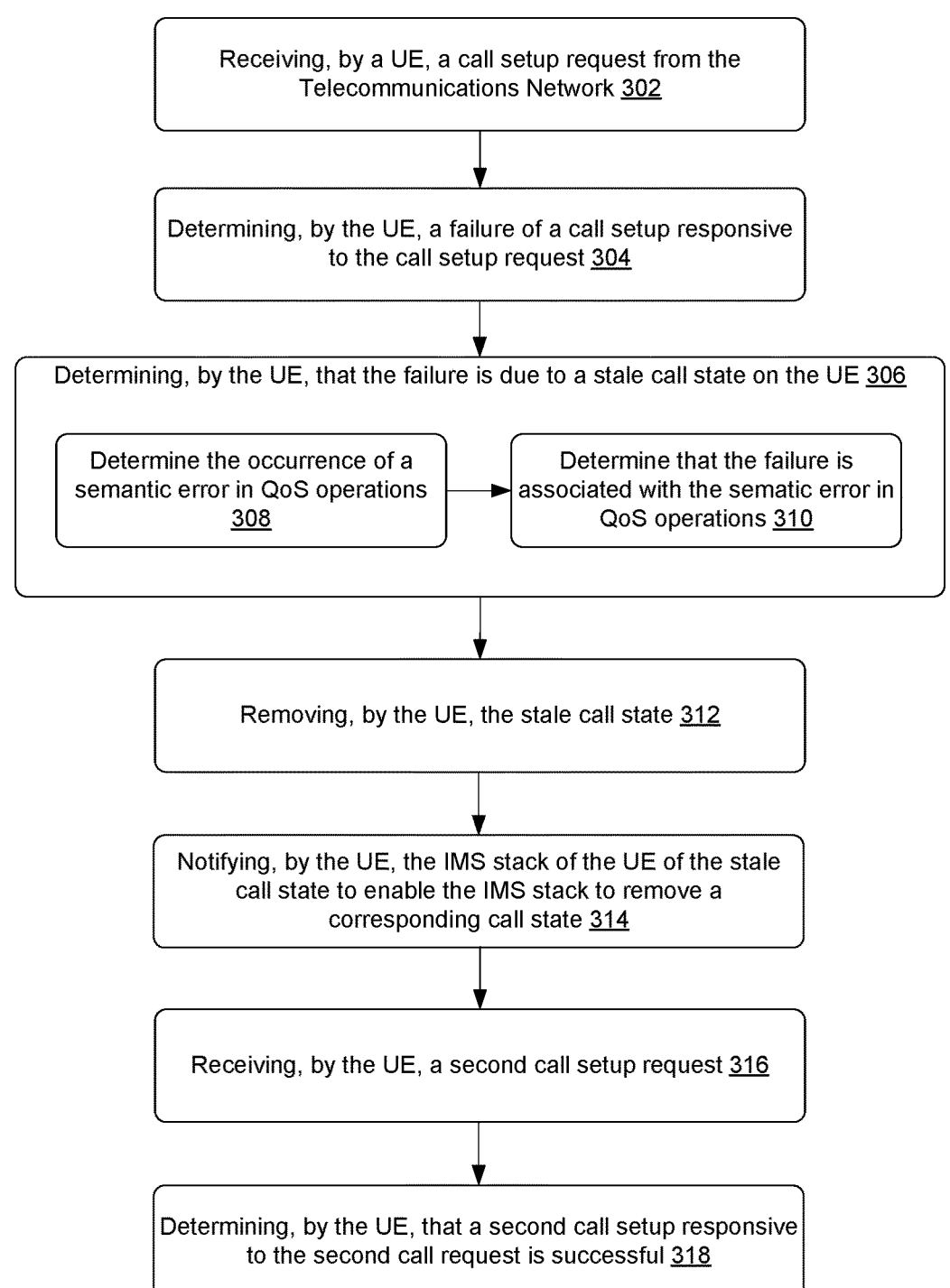

Receiving, by a UE, a call setup request from the Telecommunications Network 302

Determining, by the UE, a failure of a call setup responsive to the call setup request 304

Determining, by the UE, that the failure is due to a stale call state on the UE 306

Determine the occurrence of a semantic error in QoS operations 308

Determine that the failure is associated with the sematic error in QoS operations 310

Removing, by the UE, the stale call state 312

Notifying, by the UE, the IMS stack of the UE of the stale call state to enable the IMS stack to remove a corresponding call state 314

Receiving, by the UE, a second call setup request 316

Determining, by the UE, that a second call setup responsive to the second call request is successful 318

FIG.3

REMOVAL OF STALE CALL STATE DURING CALL SETUP

BACKGROUND

When terminating a call with a user equipment (UE), messages are exchanged between caller and called party to release resources, remove call contexts, etc. For example, if one party to a call hangs up, a session initiation protocol (SIP) BYE message may be sent to the other party. In some circumstances, however, one or more messages may not be received, and a context of a terminated call may be maintained on a UE. Further, even when such messages are received, they may not be communicated properly through in the UE, again resulting in a stale call context. In one example, the UE may have been engaged in a Voice over New Radio (VoNR) call and have a Fifth Generation (5G) Quality-of-Service (QoS) identifier (5QI)-1 call context maintained in the modem of the UE. If message(s) associated with the VoNR call termination fail to reach the modem, the 5QI-1 context may be maintained even after completion of the call.

While the stale call context (also referred to herein as "stale call state") is maintained by the UE, the UE will be unable to originate or receive new calls. Each such attempt may result in an error code, such as a "semantic error in QoS operations" code, communicated back to the telecommunication network that is attempting to start a QoS flow for the new call. Some actions, such as restarting the UE, may remove the stale call context, but until one of those actions occurs, the UE will be unable to use calling features and experience failed call after failed call.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 illustrates an overview of a UE engaging in call setup communications with a telecommunications network, experiencing call failures due to stale call state on the UE, and resolving the problem by detecting and removing the stale call state.

FIG. 3 is a flow diagrams of an illustrative process of a UE configured to determine that a failure of a call setup on the UE is due to a stale call state on the UE and, in response, to remove the stale call state.

DETAILED DESCRIPTION

Figure 2A:
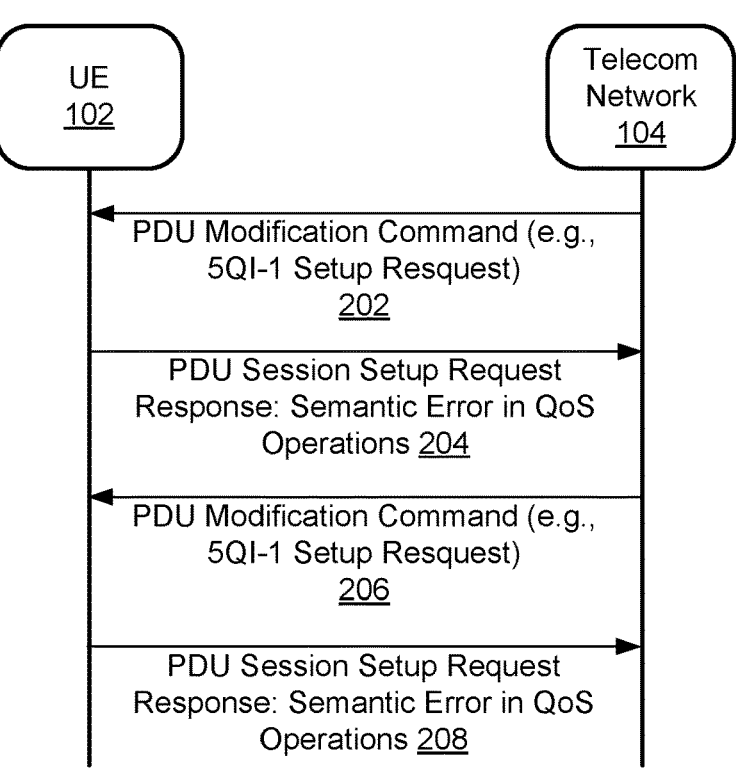
FIGS. 2a-2b are message flow diagrams showing the UE and the telecommunications network and the messages between them to setup a call, including transmitting requests and responses that indicate success or failure through, e.g., failure codes when failures occur.

This disclosure is directed in part to determining, by a UE, that a failure of a call setup is due to a stale call state on the UE and, in response, removing, by the UE, the stale call state. Prior to removing the stale call state, call setup on the UE may fail; following removal of the stale call state, call setup may be successful.

In various implementations, a call setup failure may have been responsive to a VoNR call setup request. For example, a packet data protocol (PDP) modification command, such as a 5QI-1 setup request, may be received by the UE from the telecommunications network as part of the VoNR call setup. When processed by a modem of the UE, the modem may note the stale call state and, in response, reject the call with a "semantic error in QoS operations" code in a protocol data unit (PDU) session setup request response.

As used herein, the term "stale call state" may include a 5QI-1 context or an Internet Protocol Multimedia Subsystem (IMS) context associated with a previously terminated call.

Upon determining that the call setup has failed, and upon determining that the failure is due to the stale call state on the UE (e.g., by determining the occurrence of the semantic error in QoS operations), the UE removes the stale call state. In such implementations, either or both of determining that the failure is due to the stale call state or removing the stale call state may be performed by the modem of the UE (e.g., by logic of the chipset associated with the modem). In addition to removing the stale call state, the modem of the UE may notify an IMS stack of the UE to enable the IMS stack to remove a corresponding call state.

Following the removal of the stale call state, the UE may receive further call setup request communications (e.g., further PDP modification commands) and proceed with call setup operations. Without stale call state being maintained by the UE, the call setup may be successful.

Figure 1:
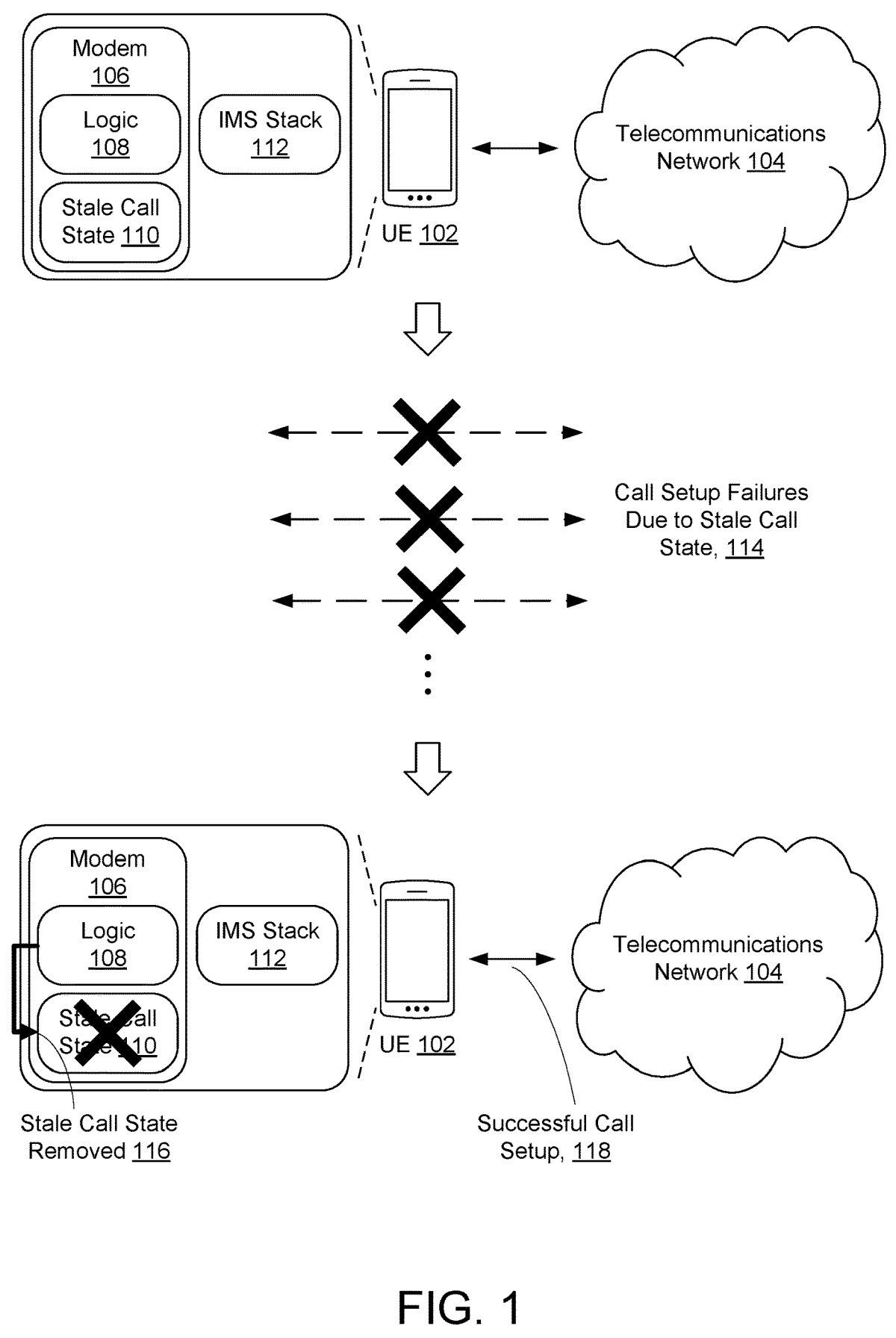

FIG. 1 illustrates an overview of a UE engaging in call setup communications with a telecommunications network, experiencing call failures due to stale call state on the UE, and resolving the problem by detecting and removing the stale call state. As illustrated, a UE 102 may be connected to a telecommunications network 104. The UE 102 may include a modem 106 having logic 108 and storing stale call state 110, as well as an IMS stack 112. Due to the stale call state 110, the UE 102 may experience, at 114, multiple failed call setups. The UE 102 may then remove that stale call state 110 at 116, enabling successful setup of a call at 118.

Figure 4:
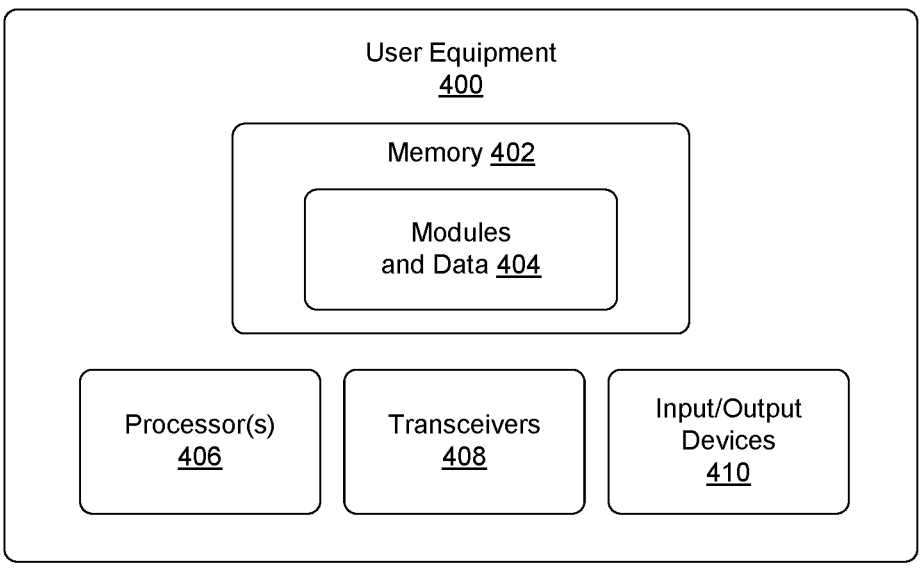
FIG. 4 is a schematic diagram of a UE configured to determine that a failure of a call setup on the UE is due to a stale call state on the UE and, in response, to remove the stale call state.

The UE 102 may be any sort of UE, such as a cellular phone, a mobile device, an Internet-of-Things device (such as a watch, goggles, or other wearable device), a tablet computer, a personal computer (PC), or any sort of device capable of wireless connectivity to one or more access points and of being moved from location to location. Such a UE 102 is illustrated by FIG. 4 and described below with reference to that figure.

In various implementations, the telecommunications network 104 may include radio access networks (RANs), including base stations such as a gNode B (gNB)—a 5G base station—or an eNode B (eNB)—a 4G/Long Term Evolution (LTE) base station. Base stations may be co-located at a same cell site or at different cell sites and may each, through its respective radio access technology, offer connectivity to the UE 102 and any other UEs in proximity and capable of connecting to that radio access technology. Based on factors such as the location of the UE 102, the number of UEs utilizing the spectrum of the radio access technology, and the types of services those UEs are using, different ones of the radio access networks may offer a better user experience at a different point in time, leading to handovers of the UE 102 between the radio access technologies of the radio access networks.

In some implementations, the telecommunications network 104 also includes a core network. Such a core network may include nodes and devices from either or both of 4G core networks or 5G core networks. Examples of those nodes and devices include an access and mobility management function (AMF), an unstructured data storage function (UDSF), a unified data management (UDM), a unified data repository (UDR), a mobility management entity (MME), a home subscriber server (HSS), a serving gateways (SGw), a packet data network gateways (PGw), a session management functions (SMF), a user plane function (UPF), a policy control function (PCF), or one or more IMS nodes, such as a call session control function (CSCF) and its nodes (proxy CSCF (P-CSCF), interrogating CSCF (I-CSCF), and serving CSCF (S-CSCF)) or a policy and charging rule function (PCRF).

In further implementations, the UE 102 can include a modem 106 and IMS stack 112. Each of the modem 106 and IMS stack 112 may be associated with its own chipset/integrated circuit and each may have a role in communication with external network(s), such as telecommunications network 104. The IMS stack 112, for example, may communicate using SIP messaging over logical connections with node(s) of the telecommunications network 104. The modem 106 may communicate using additional/other protocols with components of the telecommunications network. Also, the modem 106 may include logic 108 to engage in these communications and other operations, and may store/maintain call states/call contexts, such as the stale call state 110, which is associated with a previously terminated call.

Due to any of a number of circumstances, a call engaged in by the UE 102 may end, but the call context for that call may fail to be removed and become stale call state 110. For example, at the end of the call, a SIP BYE message may not be communicated from the telecommunications network 104 to the UE 102, either due to a failure of the air interface that is directly between the UE 102 and telecommunications network 104, due to failures of the communications between the nodes of the telecommunications network 104, or due to multiple failures. Further, even if no failures occur in the external communications from the telecommunications network 104, components within the UE 102 may fail to communicate the received message(s). The stale call state 110 thus ends up being maintained until some future action, such as restarting the UE 102, causes the UE 102 to remove the stale call state 110. Until this occurs, successive call setup attempts may fail, as shown at 114.

For example, either the UE 102 or another device may initiate a call. Regardless of which party initiates the call, the telecommunications network starts a QoS flow and sends a PDP modification command to the UE 102. If the call is a VoNR call, the QoS flow may be a 5QI-1 flow and the PDP modification command may be or include a 5QI-1 setup request. The PDP modification command or parts of that message may be processed by the logic 108 of the modem 106, and the logic 108 sends back an error or message rejecting the call since it encounters stale call state 110 on the modem 106. The stale call state 110 may be, for example, a 5QI-1 context or IMS context, and upon detecting the stale call state 110, the logic 108 may determine the occurrence of an error code such as a semantic error in QoS operations. The UE 102 may then respond to the telecommunications network 104 with a PDU session setup request response message including the error code (e.g., including the semantic error in QoS operations). If the stale call state 110 is not removed, these same circumstances-call setup failure due to the stale call state 110, responding to the telecommunications network 104 with an indication of failure-will continue to repeat (as shown at 114).

In various implementations, however, the logic 108 of modem 106 is configured to remove the stale call state 110 in response to determining that a call setup failure is due to the stale call state 110. The logic 108 may determine that the failure is due to the stale call state 110 by determining the occurrence of a semantic error in QoS operations. As that error code (i.e., a semantic error in QoS operations) is produced responsive to encountering a call context/call state in the modem 106, the logic 108 may treat the semantic error in QoS operations as a signal of a stale call state 110 being present in the modem 106. So while the call attempt may fail when the semantic error in QoS operations is encountered, and the UE 102 may respond to the telecommunications network 104 with the semantic error in QoS operations, the logic 108 may proceed with removing the stale call state 110 so that the next call attempt will not fail, or will at least not fail due to presence of stale call state 110. The removal of the stale call state 110 is shown at 116.

In some implementations, the UE 102, after the removal of the stale call state 110, the IMS stack 112 may be notified of the removal of the stale call state 110 and may remove any correspond call state/call context.

With the stale call state 110 removed, subsequent call setup requests, including PDP modification commands for setting up QoS flows, will not fail, or at least not fail on account of stale call state 110. The UE 102 may then respond to the PDP modification command with a PDU session setup request response indicating success (e.g., a message indicating 5QI-1 setup success).

Figure 2B:
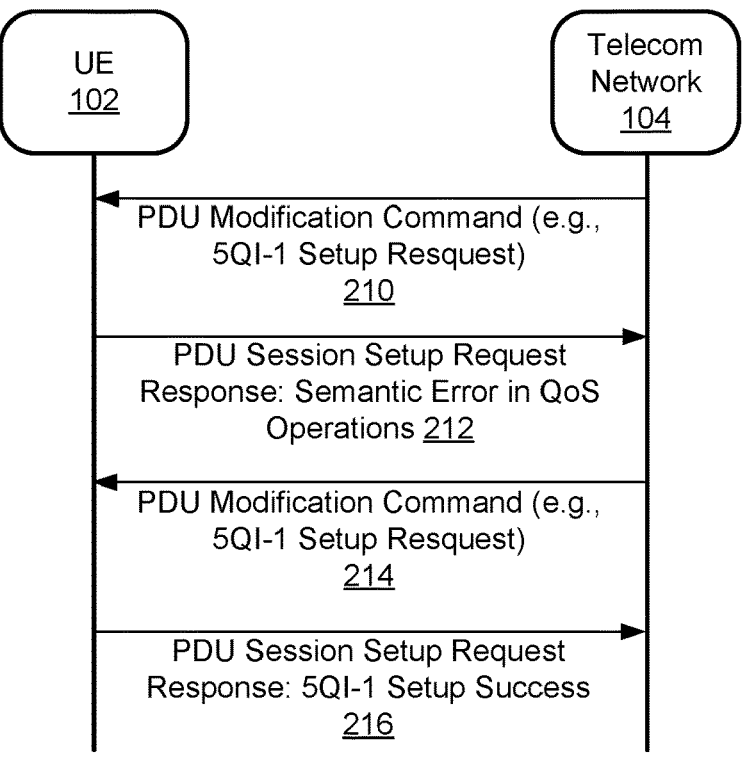

FIGS. 2a-2b are message flow diagrams showing the UE and the telecommunications network and the messages between them to setup a call, including transmitting requests and responses that indicate success or failure through, e.g., failure codes when failures occur. As illustrated in both FIG. 2a and FIG. 2b, a UE 102 and telecommunications network exchange messages.

In FIG. 2a, a message exchange is shown where the UE 102 has not removed stale call state and repeated call setup failures occur. At 202, during a call setup for a call, the telecommunications network 104 sends a PDP modification command, such as a 5QI-1 setup request, to the UE 102 to set up a QoS flow for the call. At 204, after operations on the UE 102 described further herein, the UE 102 sends a PDU session setup request response, including a semantic error in QoS operations code, in response to the PDP modification command. Subsequently, as the UE 102 continues to maintain the stale call state 110, another call setup failure is shown occurring. At 206, during a call setup for a second call, the telecommunications network 104 sends a PDP modification command, such as a 5QI-1 setup request, to the UE 102 to set up a QoS flow for the second call. At 208, after operations on the UE 102 described further herein, the UE 102 sends a PDU session setup request response, including a semantic error in QoS operations code, in response to the PDP modification command.

In FIG. 2b, a message exchange is shown where the UE 102 removes the stale call state while rejecting a first call and responds with the stale call state removed to a second call. At 210, during a call setup for the first call, the telecommunications network 104 sends a PDP modification command, such as a 5QI-1 setup request, to the UE 102 to set up a QoS flow for the first call. At 212, after operations on the UE 102 described further herein, the UE 102 sends a PDU session setup request response, including a semantic error in QoS operations code, in response to the PDP modification command. Before, during, or after sending the response at 212, the UE 102 removes the stale call state. The UE 102 may have determined that the call setup failure responsive to the PDP modification command at 210 was due to the stale call state and removed the stale call state in response. At 214, during a call setup for the second call, the telecommunications network 104 sends a PDP modification command, such as a 5QI-1 setup request, to the UE 102 to set up a QoS flow for the second call. At 216, after operations on the UE 102 described further herein, the UE 102 sends a PDU session setup request response indicating success, such as a 5QI-1 setup success message, in response to the PDP modification command.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 is a flow diagrams of an illustrative process of a UE configured to determine that a failure of a call setup on the UE is due to a stale call state on the UE and, in response, to remove the stale call state. As illustrated at 302, a UE may receive a call setup request, such as a VoNR call setup request, from a telecommunications network. In some examples, the call setup request may be in the form of a PDP modification command, such as a 5QI-1 setup request, associated with establishing a QoS flow for a call.

At 304, the UE may determine the failure of a call setup at the UE responsive to the call setup request.

At 306, the UE determines that the failure of the call setup is due to a stale call state on the UE. In some implementations, the UE may determine that the failure is due to the stale call state by determining, at 308, the occurrence of a semantic error in QoS operations responsive to the call setup request and determining, at 310, that the failure is associated with the semantic error in QoS operations. In various implementations, the stale call state may be one of a 5QI-1 context or an IMS context.

At 312, in response to determining that the failure is due to the stale call state, the UE removes the stale call state from the UE.

At 314, after removing the stale call state, the UE may notify an IMS stack of the UE of the stale call state to enable the IMS stack to remove a corresponding call state.

At 316, after removing the stale call state, the UE may receive a second call setup request, such as a second VoNR call setup request.

At 318, the UE may determine that a second call setup responsive to the second call setup request is successful.

In various implementations, some or all of the operations described with respect to blocks 302-318 may be performed by logic of a modem of the UE, and the stale call state may be maintained in the modem.

FIG. 4 is a schematic diagram of a UE configured to determine that a failure of a call setup on the UE is due to a stale call state on the UE and, in response, to remove the stale call state. As shown, the UE 400 includes a memory 402 storing modules and data 404, processor(s) 406, transceivers 408, and input/output devices 410.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 402 can include one or more software or firmware elements, such as computer-readable instructions that are executable by the one or more processors 406. For example, the memory 402 can store computer-executable instructions associated with modules and data 404. The modules and data 404 can include a platform, operating system, and applications, and data utilized by the platform, operating system, and applications. Further, the modules and data 404 can implement any of the functionality for the UE 102, node(s) of the telecommunications network 104, or any other node/device described and illustrated herein.

In additional or alternative embodiments, the UE 400 may also include a modem, such as modem 106 in FIG. 1, that comprises a part of the memory 402 and transceivers 408. The modem may include modules and data 404, such as the logic 108 and stale call state 110. Further, the UE 400 may include an IMS stack 112, that also comprises a part of the memory 402 and transceivers 408.

In various examples, the processor(s) 406 can be a central processing unit (CPU), a graphics processing unit (GPU), or both CPU and GPU, or any other type of processing unit. Each of the one or more processor(s) 406 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 402, which can be associated with types of volatile (RAM) and/or nonvolatile (ROM) memory.

The transceivers 408 can include modems, interfaces, antennas, Ethernet ports, cable interface components, and/or other components that perform or assist in exchanging wireless communications, wired communications, or both.

While the computing device need not include input/output devices 410, in some implementations it may include one, some, or all of these. For example, the input/output devices 410 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 410 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 410 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A user equipment (UE) comprising:
one or more processors; and
a plurality of programming instructions that, when operated by the one or more processors, cause the UE to perform operations including:
  determining that an occurrence of a semantic error in quality-of-service (QoS) operation indicates a stale call state on the UE; and
  in response to the determining, removing the stale call state from the UE.

2. The UE of claim 1, wherein the stale call state is one of a fifth generation (5G) QoS identifier (5QI)-1 context or an Internet Protocol Multimedia Subsystem (IMS) context.

3. The UE of claim 1, wherein the operations further comprise receiving a call setup request.

4. The UE of claim 3, wherein the call setup request is a fifth generation (5G) QoS identifier (5QI)-1 setup request.

5. The UE of claim 3, wherein determining the occurrence of the semantic error in QoS operations comprises determining a failure of a call setup responsive to the call setup request and determining that a reason for the failure is presence of the stale call state on the UE.

6. The UE of claim 1, wherein the operations further comprise, after removing the stale call state, notifying an Internet Protocol Multimedia Subsystem (IMS) stack of the UE of the stale call state to enable the IMS stack to remove a corresponding call state.

7. The UE of claim 1, wherein the operations further comprise, after removing the stale call state, receiving a second call setup request and determining that a second call setup responsive to the second call setup request is successful.

8. The UE of claim 1, wherein the determining and the removing are performed by logic of a modem of the UE, and the stale call state is maintained in the modem.

9. A method implemented in a user equipment (UE), the method comprising:
receiving a voice over new radio (VoNR) call setup request;

determining a failure of a call setup responsive to the VoNR call setup request;
determining that the failure is due to presence of a stale call state on the UE; and
in response to determining that the failure is due to the presence of the stale call state, removing the stale call state.

10. The method of claim 9, wherein the stale call state is one of a fifth generation (5G) quality-of-service (QoS) identifier (5QI)-1 context or an Internet Protocol Multimedia Subsystem (IMS) context.

11. The method of claim 9, wherein the VoNR call setup request is a fifth generation (5G) quality-of-service (QoS) identifier (5QI)-1 setup request.

12. The method of claim 9, wherein determining that the failure is due to the presence of the stale call state comprises determining that the failure is associated with a semantic error in quality-of-service (QoS) operation.

13. The method of claim 9, further comprising, after removing the stale call state, receiving a second VoNR call setup request.

14. The method of claim 13, further comprising determining that a second VoNR call setup responsive to the second VoNR call setup request is successful.

15. A non-transitory computer storage medium having a plurality of programming instructions stored thereon that, when executed by a processor associated with a user equipment (UE), cause the UE to perform operations comprising:
determining that a failure of a call setup on the UE is due to a stale call state on the UE; and
in response to the determining, removing the stale call state.

16. The non-transitory computer storage medium of claim 15, wherein the stale call state is one of a fifth generation (5G) quality-of-service (QoS) identifier (5QI)-1 context or an Internet Protocol Multimedia Subsystem (IMS) context.

17. The non-transitory computer storage medium of claim 15, further comprising receiving a call setup request that resulted in the call setup that failed.

18. The non-transitory computer storage medium of claim 17, wherein the call setup request is a fifth generation (5G) quality-of-service (QoS) identifier (5QI)-1 setup request.

19. The non-transitory computer storage medium of claim 15, wherein the determining comprises determining the failure of the call setup and determining that the failure is associated with a semantic error in quality-of-service (QoS) operation.

20. The non-transitory computer storage medium of claim 15, wherein the operations further comprise, after removing the stale call state, receiving a second call setup request and determining that a second call setup responsive to the second call setup request is successful.

* * * * *